US006749014B2

(12) United States Patent
Ferraro

(10) Patent No.: US 6,749,014 B2
(45) Date of Patent: Jun. 15, 2004

(54) EXTERNAL FLUE HEAT EXCHANGERS

(76) Inventor: Joseph C. Ferraro, 150 Central Ave., Farmingdale, NY (US) 11735

( * ) Notice: Subject to any disclaimer, the term of this patent is extended or adjusted under 35 U.S.C. 154(b) by 0 days.

(21) Appl. No.: 10/046,013

(22) Filed: Jan. 11, 2002

(65) Prior Publication Data

US 2002/0060065 A1 May 23, 2002

Related U.S. Application Data

(63) Continuation-in-part of application No. 09/404,073, filed on Sep. 23, 1999.

(51) Int. Cl.[7] .............................. F28D 7/12; F28D 7/02; F24H 3/00; F24B 7/00
(52) U.S. Cl. ......................... 165/156; 165/47; 165/163; 237/55
(58) Field of Search ................................ 165/156, 901, 165/909, 163, 135, 47; 126/312, 307 R; 237/55

(56) References Cited

U.S. PATENT DOCUMENTS

| | | | |
|---|---|---|---|
| 1,458,876 A | 6/1923 | Confer | |
| 1,990,056 A | 2/1935 | Van Daam | 126/20 |
| 2,521,462 A | 9/1950 | Kinzelmann | 126/362 |
| 3,896,992 A | 7/1975 | Borovina et al. | 237/19 |
| 4,037,567 A | 7/1977 | Torres | 122/20 |
| 4,120,267 A | 10/1978 | Wood | 122/20 |
| 4,122,801 A | 10/1978 | Burns | 122/20 |
| 4,136,731 A | 1/1979 | DeBoer | 165/12 |
| 4,206,805 A * | 6/1980 | Beckett | 165/80.5 |
| 4,211,187 A | 7/1980 | Farris | 122/20 |
| 4,251,028 A | 2/1981 | Nicolai et al. | 237/8 R |
| 4,401,261 A | 8/1983 | Brown | 236/10 |
| 4,437,513 A * | 3/1984 | Castiglioni et al. | 165/901 |
| 4,484,564 A | 11/1984 | Erickson | 126/365 |
| 5,249,623 A * | 10/1993 | Muller | 165/156 |
| 5,385,299 A * | 1/1995 | Zawada | 237/55 |
| 5,799,726 A * | 9/1998 | Frank | 165/156 |
| 5,921,230 A * | 7/1999 | Vessells et al. | 126/361 |
| 6,068,047 A | 5/2000 | Buchhave | 165/77 |

FOREIGN PATENT DOCUMENTS

| | | | |
|---|---|---|---|
| CA | 1271380 A | | 7/1990 |
| DE | 33480281 A | | 6/1985 |
| GB | 2061476 | * | 5/1981 |
| JP | 58-31286 A | | 2/1983 |
| SU | 779719 | | 11/1980 |

* cited by examiner

Primary Examiner—Henry Bennett
Assistant Examiner—Tho V Duong
(74) Attorney, Agent, or Firm—Alfred M. Walker

(57) ABSTRACT

A heat exchanger is mounted external to a section of flue pipe or is an integral part of a section of flue pipe. The heat exchanger preheats a domestic hot water supply and boosts the return water temperature prior to reentry to the furnace coil. The heat exchanger reduces fuel use, pollution and wear of the furnace and burner. A typical heat exchanger installation includes an oil or gas burner located on a furnace or boiler having a flue pipe leading to a gaseous outlet, such as a masonry chimney. A short vertical flue section leads to a draft-regulating damper. The flue heat exchanger may be a coil of tubing wrapped around flue section, such that the tubing picks up heat from the heated flue gasses. Preheated water exits from the heat exchanger.

2 Claims, 11 Drawing Sheets

EXTERNAL FLUE HEAT EXCHANGERS

RELATED APPLICATIONS

This application is a continuation-in-part of application Ser. No. 09/404,073, filed Sep. 23, 1999.

FIELD OF THE INVENTION

The present invention relates to heat exchangers, which are mounted external to a section of flue pipe or are an integral part of a section of flue pipe.

BACKGROUND OF THE INVENTION

Heat exchangers are known, which direct water in a pipe through a flue.

U.S. Pat. No. 4,122,801 of Burns describes a heat exchanger which first encircles water pipes in 2 circular rings around an exhaust flue, but then directs the water into coils within the exhaust flue. The external rings appear to be for positioning the water flow headers equally around the flue, not to preheat the water.

U.S. Pat. No. 4,211,187 of Farris discloses an energy conservation system for heaters that uses a heat exchanger in a furnace chamber or duct.

U.S. Pat. No. 4,136,731 of DeBoer discloses a heat transfer apparatus for supplementing a building heating and cooling system, using a heat exchanger in a furnace flue. DeBoer suggests an external heat exchanger, but provides no enabling details thereof.

Japanese patent no. JA0031286 of Satou discloses a heat transfer pipe for high temperature gases. It has a shell with multiple, non-axial connected heat exchangers.

U.S. Pat. No. 6,068,047 of Buchhave describes a heat exchanger for a sludge containment structure made of two rigid half shells, wherein sludge flows in the annular space enclosed by the shell halves and an inner sleeve in a spiral path external the spiral tubing with heating fluid flowing therethrough.

U.S. Pat. No. 4,484,564 of Erickson disclose a water heater utilizing exhaust gases from furnaces or stoves, but the recovery is through a coil inside an exhaust flue.

U.S. Pat. No. 1,990,056 of Van Daam describes passing water through a spherical corrugated chamber.

U.S. Pat. No. 4,251,028 of Nicolai discloses a preheater with an internal wall parallel to an external side wall with a water tight seal with pressure restraining capability. It does not disclose a coil of hollow heat conductive tubing enclosed within a substantially dry cavity.

U.S. Pat. No. 3,896,992 of Borovina and U.S. Pat. No. 2,521,462 of Kinzelmann both disclose water heaters that pass water through a spiral coil within an exhaust flue.

Canadian patent no. CA1271380 of Hampden describes a heat exchanger for air, not fluids, which is heated in a replaceable flue section. Hampden uses a blower to draw air through fins in an annular space.

U.S. Pat. No. 4,037,567 of Torres proposes an exhaust flue over the water heater having a spiral coil for heating water therein.

U.S. Pat. No. 4,120,267 of Wood describe a tube and plate heat exchanger with water heating coils inside a chamber, such as a gas heat duct or flue.

German patent no. DE 3340281A of Grabietz describes a flue within a jacket wherein coiled water tubes wrap around the inner flue pipe. However, the space between the tubes positioned over the inner flue and within the outer jacket are filled with solid, cast molten metal, instead of fibrous insulation.

Soviet Union patent no. SU0779719 of Ukrorgtekhstroi discloses a heat exchanger with inner fins, not coils, which has heat resistant end caps enclosing a flue pipe. The fins are spiraled, but they are not hollow and do not carry fluid therein. Ukrorgtekhstroi does not contain tubing wrapped around a flue pipe.

Furthermore, U.S. Pat. No. 4,401,261 of Brown also discloses directing water coils inside of flues.

OBJECTS OF THE INVENTION

It is therefore an object of the present invention to provide a heater exchanger for domestic hot water with ease of installation, maintenance and removal.

It is another object of the invention to provide a heat exchanger that is conveniently attached to an existing flue.

It is a further object of the present invention to preheat a domestic hot water supply.

It is yet another object of the present invention to boost return water temperature in a hydronic heating installation prior to reentry to a furnace coil.

It is still another object of the present invention to reduce fuel use and to reduce pollution and wear of the furnace and burner.

It is yet another object of the present invention to improve over the disadvantages of the prior art.

SUMMARY OF THE INVENTION

In keeping with these objects and others, which may become apparent, the present invention includes heat exchangers mounted external to a section of flue pipe or as an integral part of a section of flue pipe. The heat exchanger preheats the domestic hot water supply and boosts the return water temperature in a hydronic heating installation prior to reentry to the furnace coil. The heat exchanger reduces fuel use and reduces pollution and wear of the furnace and burner.

In a preferred embodiment, a split heat exchanger formed from two half shells forms a heat exchanger with conduits having flow reversals to enhance heat transference.

A typical heat exchanger installation includes an oil or gas burner located on a furnace or boiler having a flue pipe leading to a gaseous outlet, such as a masonry chimney. A short vertical flue section leads to a draft-regulating damper. The flue heat exchanger may be a coil of copper tubing wrapped around the flue section, which picks up heat from the heated flue gasses. The cold water source is coupled to a short length of convoluted flexible tubing with coupling flanges thereby allowing water to travel to and from the flue mounted heat exchanger.

In another embodiment two flue heat exchangers communicate with cold water entering the horizontal heat exchanger which is wrapped around a flue section having a mixture of hot flue gasses and some make-up ambient air from the draft regulating damper. This heat exchanger is plumbed in series with another heat exchanger wrapped around the vertical section of flue pipe below a damper. The second heat exchanger again increases the water temperature prior to entering the furnace hot water coil.

In another embodiment a heat exchanger is prefabricated as a standard flue section and substitutes for a length of flue. This heat exchanger has a central flue pipe section with heat exchanger tubing wrapped around its periphery. A tubular shell encases the tubing with openings allowing for both the water inlet and water outlet coupling flanges. A highly conductive conformable material fills the empty spaces within the shell to increase heat transfer.

In another embodiment, a hydronic heating system is a hydronic loop circulated by circulator pump forcing water into heating coil inside a boiler or furnace. In this system, it first flows through heat exchanger where it picks up waste heat from the flue.

In a further preferred embodiment a preformed heat exchanger coil is wrapped around a cylindrically shaped sheet larger in diameter than a section of flue. This sheet is not totally enclosed, but it has a small gap along its length.

In yet another embodiment, two coiled heat exchanger conduits are interleaved together around a flue pipe.

Each embodiment of the heat exchanger may include a safety pressure relief valve through which preheated water may exit.

Often when two or more different types of metals contact each other, the metals deteriorate, corrode or weaken at the point of contact. Therefore, each embodiment of flue heat exchanger may also be constructed such that both the metal tubing and the section of flue piping that the metal tubing is wrapped around are made from the same type of metal, preferably copper. In addition, each embodiment that contains this variation may also include gaskets located at each end of this flue section (preferably copper), such that the gaskets prevent direct contact between this flue pipe section and the flue pipe section made from a different type of metal.

In a further embodiment of this invention, the heat exchanger comprises of two identical sections, each essentially of the shape of a half cylindrical tube, with an internal diameter which matches the external diameter of a flue pipe. By just assembling the two halves around an existing flue pipe in-situ and bolting them together through flanges, it is unnecessary to disconnect flue pipe sections with the attendant debris usually encountered. Thus this embodiment is easier to install, lower cost (since the original flue pipe is retained), easier to package, and adaptable to single or split use, such as domestic hot water and hydronic heating.

BRIEF DESCRIPTION OF THE DRAWINGS

The present invention can best be understood in conjunction with the accompanying drawings, in which.

DETAILED DESCRIPTION OF THE INVENTION

For ease of installation, maintenance, and removal, the heat exchangers of this invention are mounted external to a section of flue pipe or are an integral part of a section of flue pipe.

Although the primary application is the preheating of a domestic hot water supply, a secondary application is the boosting of return water temperature in a hydronic heating installation prior to reentry to the furnace coil. In either case, the objectives are to reduce fuel use and to reduce pollution and wear of the furnace and burner.

Figure 1:
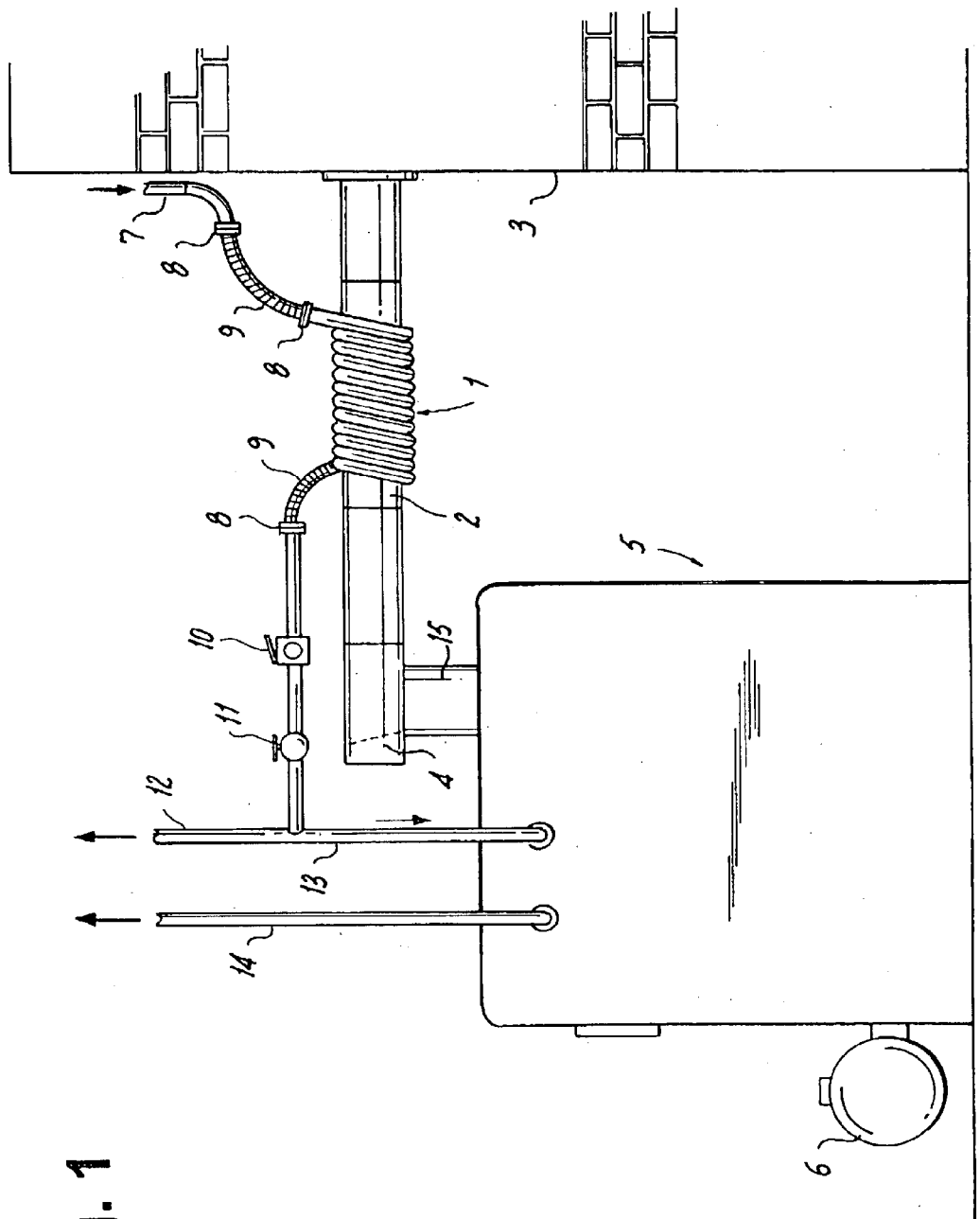
FIG. 1 is a side elevation view of a flue heat exchanger installation of the present invention.

FIG. 1 shows a typical installation showing an oil or gas burner 6 on a furnace or boiler 5 with flue pipe section 2 leading to masonry chimney 3. A short vertical flue section 15 leads to a draft regulating damper 4. The flue heat exchanger 1 includes a coil of heat conductive tubing, such as copper tubing, which is wrapped around flue section 2. Flue heat exchanger picks up heat from the heated flue gasses within flue section 2. The cold water source 7 is coupled to a short length of convoluted flexible tubing 9 with coupling flanges 8 at either end, which couple the cold water through heat exchanger 1. The exit of preheated water from heat exchanger 1 is coupled to another short length of flexible tubing 9 and then coupled to a short length of pipe via coupling flanges 8.

This leads to a safety pressure relief valve 10 and isolation valve 11 (normally open) which couples the preheated water to a domestic supply pipe 12 (optional) and to the boiler 5 hot water coil intake 13. Pipe 14 is the normal domestic hot water supply line from the hot water coil.

The need for safety pressure relief valve 10 is predicated on rare events, which could conspire to cause boiling or excessive pressure in heat exchanger 1. While flue surface temperatures above 212 degrees F. are sometimes encountered, water at normal supply pressure (above 35 psig) requires a flue temperature over 280 degrees F. to present a danger of boiling. In the event of a defective well pump or control, the water pressure could be abnormally low. Likewise, an improperly adjusted fuel burner could produce abnormally high flue temperatures approaching 300 degrees F. The combination of such events may result in excessive pressures, hence the pressure relief valve. This danger is more pronounced in situations with a common boiler supplying heat and hot water since it would be more likely for the burner to be on while there is no call for domestic hot water; and there would be no cooling water flow through the heat exchanger.

Figure 2:
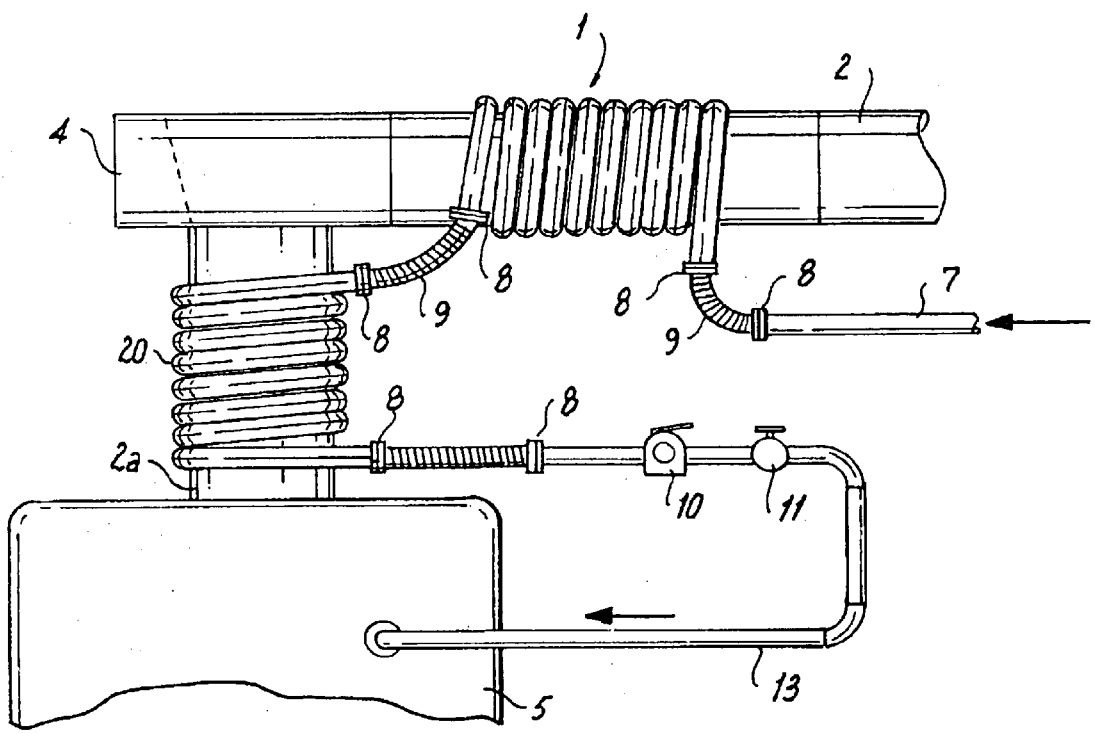
FIG. 2 is a side elevation view of an installation using two flue heat exchangers.

FIG. 2 shows an installation using two flue heat exchangers 1 and 20 in a single installation. The coldest water enters the horizontal heat exchanger 1, which is wrapped around flue section 2 having a mixture of hot flue gasses and some make-up ambient air from draft regulating damper 4. Heat exchanger 1 is plumbed in series with heat exchanger 20, which is wrapped around the vertical section 2a of flue pipe below damper 4. This section of flue pipe 2a has a surface temperature higher than flue section 2 since it is closer to furnace 5 and only has hot flue gasses within. Therefore, heat exchanger 20 further boosts water temperature prior to entering the furnace 5 hot water coil.

Figure 3:
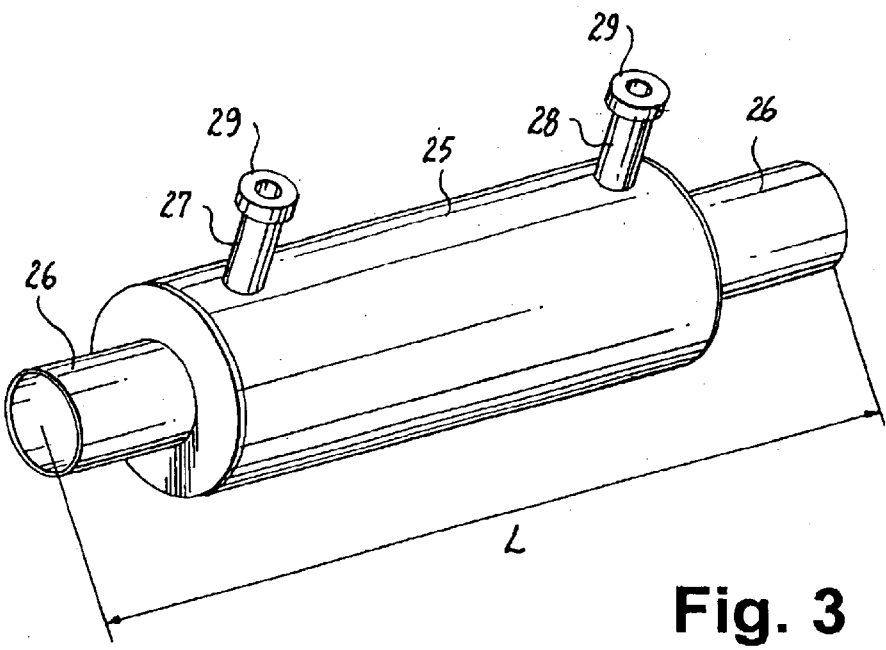
FIG. 3 is a perspective view of an alternate embodiment for a flue heat exchanger.
Figure 4:
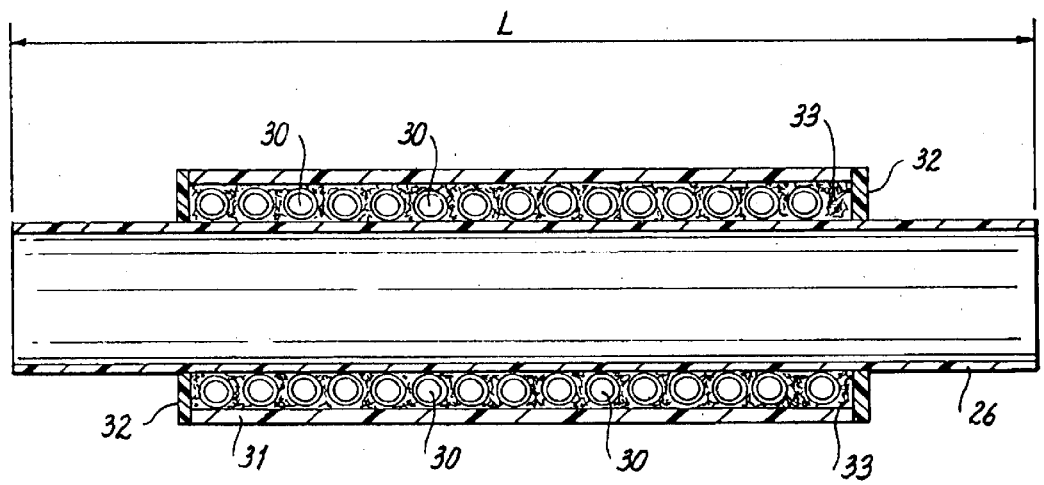
FIG. 4 is a side cross sectional view of the embodiment shown in FIG. 3.

FIGS. 3 and 4 show two views of an alternate embodiment 25 of the heat exchanger of this invention. This heat exchanger 25 is prefabricated as a standard flue section length L. It would be simply substituted for a length of flue. Heat exchanger 25 includes a central flue pipe section 26 with heat exchanger tubing 30 wrapped around its periphery. A tubular shell 31 with heat resistant end caps 32 encases the tubing 30 with openings for inlet 28 and outlet 27 extensions terminating in coupling flanges 29. A highly conductive conformable material 33 such as copper or aluminum wool is forced between flue 26 surface and coils 30 and generally fills the empty spaces within shell 31 to increase heat transfer. Further efficiency is achieved if shell 31 is a thermal insulator such as a fiberglass liner within a plastic hard shell.

Figure 3A:
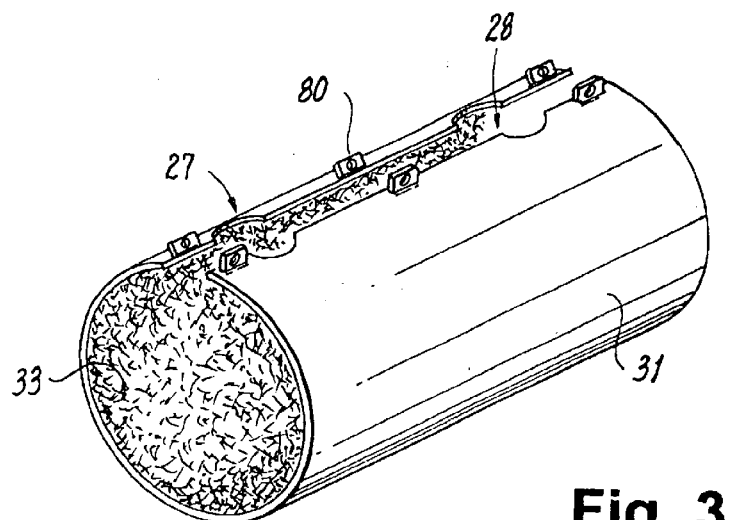
FIG. 3a is a perspective view of an alternate embodiment of a heat exchanger cover.

FIG. 3a shows a removable embodiment of tubular shell 31 with openings for inlet 28 and outlet 27 extensions. A highly heat conductive conformable material 33 such as copper or aluminum wool is secured to the entire inner wall of tubular shell 31. Clasps 80 are placed along the outside of the surface of tubular shell 31 thereby allowing a means to secure the tubular shell around both flue pipe 26 and heat exchanger coil 30.

Figure 5:
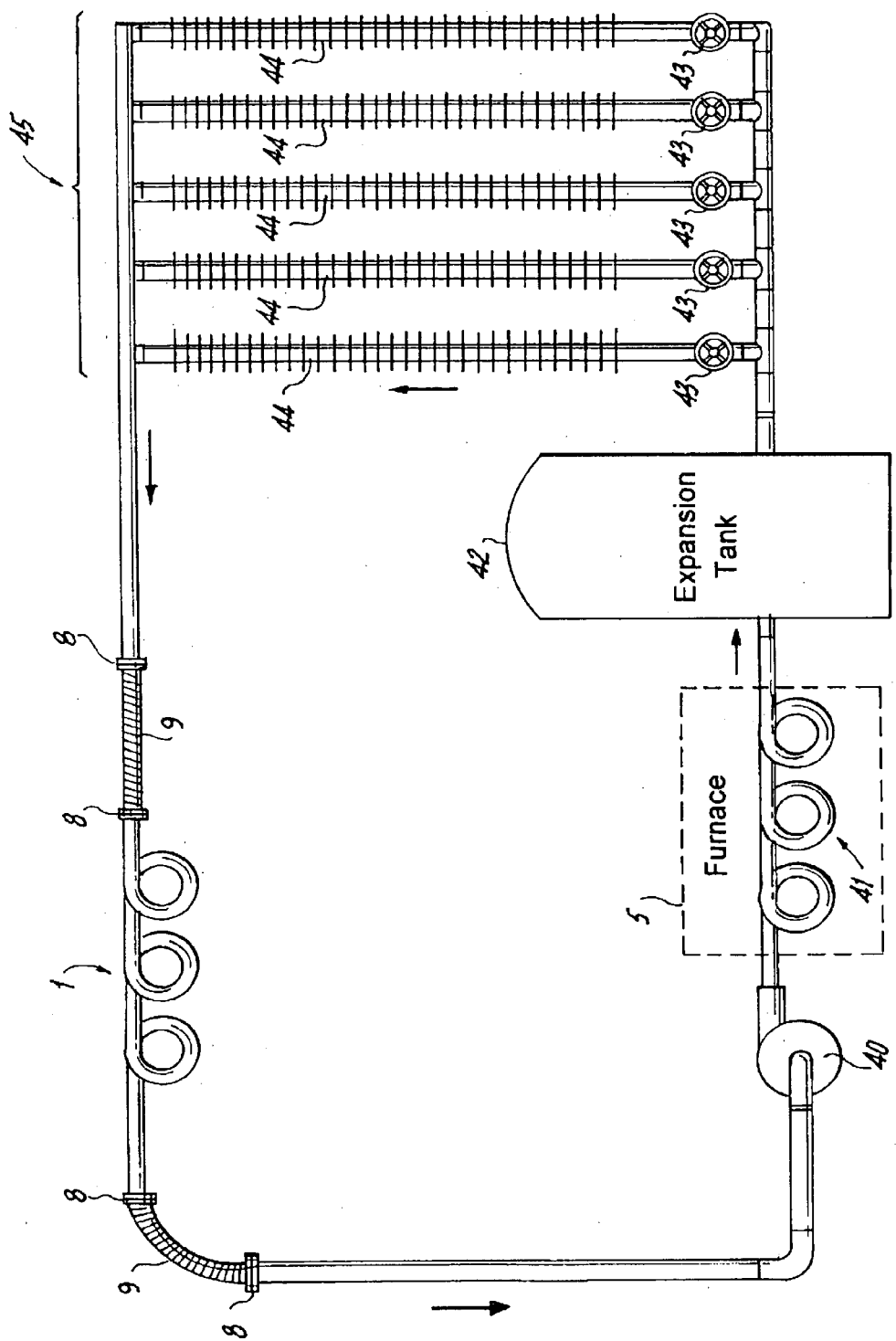
FIG. 5 is a plumbing diagram of a flue heat exchanger used for hydronic heating.

FIG. 5 shows the plumbing hook-up for the use of an external flue heat exchanger 1 in a hydronic heating system using fin tube heating elements 44. The basic circuit is a hydronic loop circulated by circulator pump 40 forcing water into heating coil 41 inside boiler (furnace) 5 then leading to expansion tank 42 and further to a parallel arrangement of zone valves 43 through fin tube sections (baseboard hot water room units) 44 and through return manifold 45. In systems without heat exchanger 1, this return flow would be directly plumbed to the intake of circulator pump 40. In this system, the return flow first flows through heat exchanger 1 where it picks up waste heat from the flue.

Figure 6:
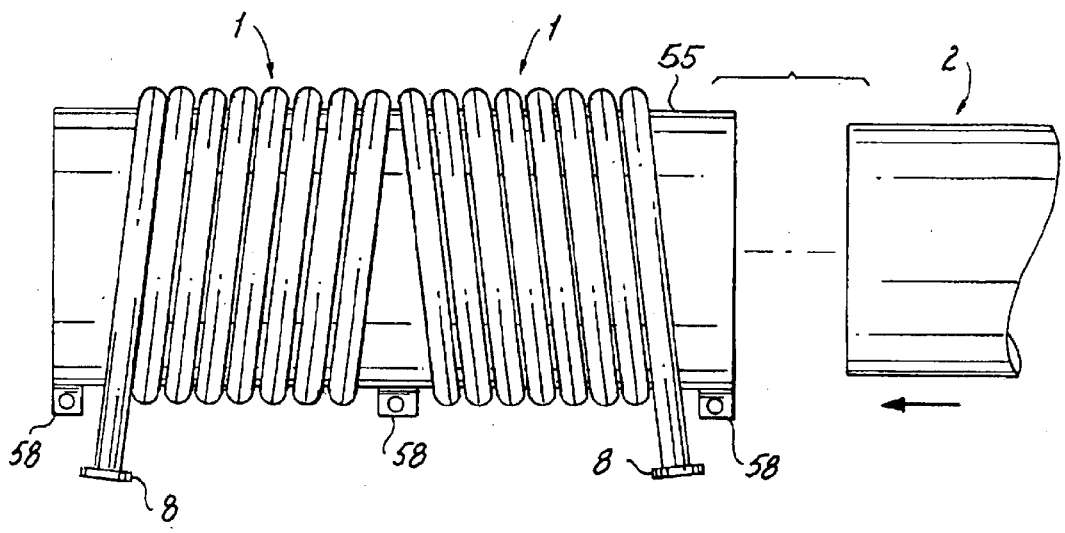
FIG. 6 is a side elevation view of a preferred embodiment of a flue heat exchanger.
Figure 7:
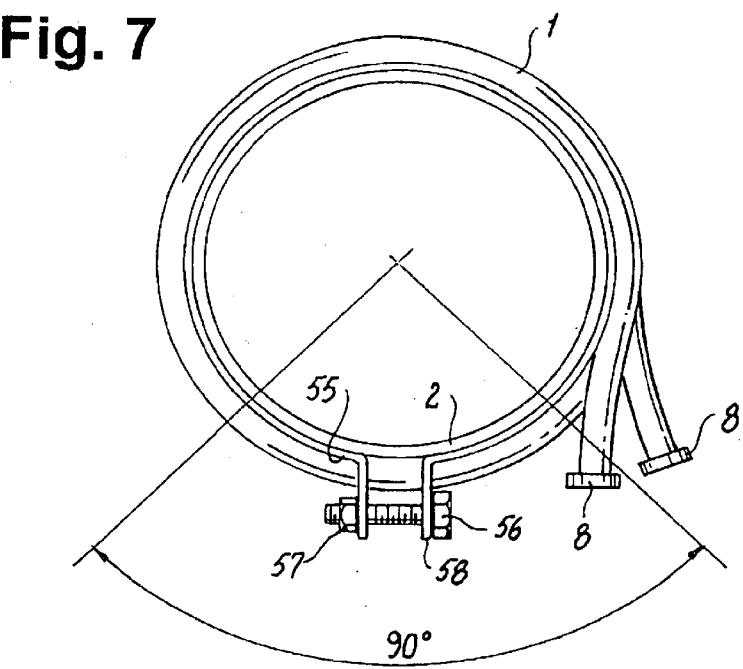
FIG. 7 is an end view of the embodiment shown in FIG. 6.

The preferred embodiment shown in FIGS. 6 and 7 shows a preformed heat exchanger coil 1 wrapped around a cylindrically shaped sheet (or sleeve) of metal 55 such as copper which is slightly larger in diameter than a section of flue. Sheet 55 is not totally enclosed, but it has a small gap along its length. The cylindrically shaped sheet is soldered or brazed to the copper tubing 1 for approximately three-quarters of its circumference to enhance heat transfer. The region indicated by 90 degrees in FIG. 7 is not bonded to tubing 1, thereby allowing the sleeve to open and enclose the flue. Three sets of clamping tabs 58 are located at each end and in the middle in a gap between adjacent coils of tubing 1. Bolts 56 and nuts 57 are used through tabs 58 to insure sheet 55 fits securely around a flue section 2.

Figure 8:
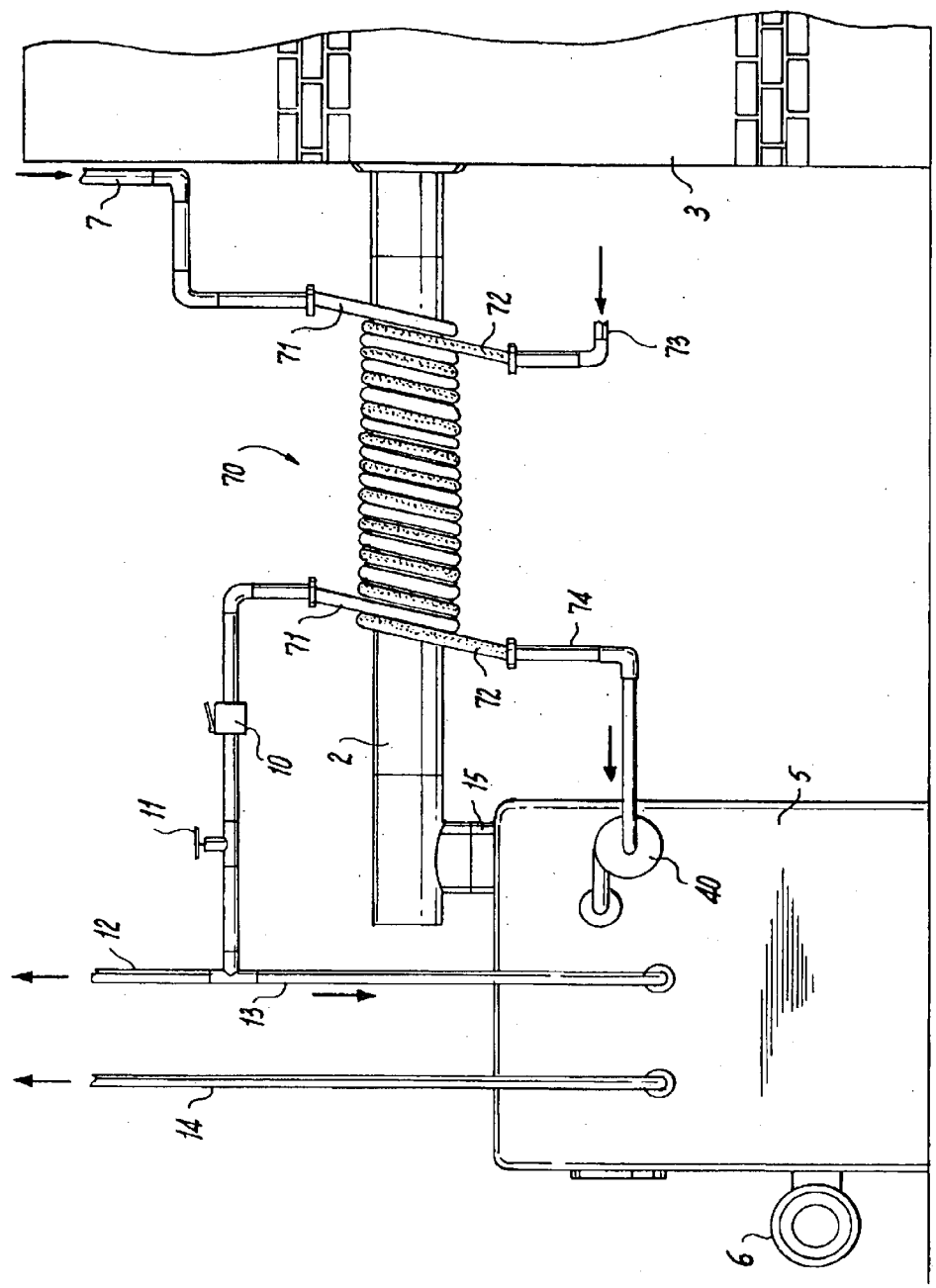
FIG. 8 is a side elevation view of an interleaved heat exchanger installation.

An alternate embodiment specifically for dual-use boiler installations is shown in FIG. 8. An interleaved coil flue heat exchanger 70 is shown wrapped over flue pipe section 2. It includes two separate conduits. Coil 71 plumbed into the domestic hot water return 13 and coil 72 plumbed into the hydronic heating return line 73. The method for forming this flue heat exchanger 70 is to coil two lengths of bendable tubing together resulting in the interleaved coils of sections 71 and 72. The plumbing is straightforward with the outlet end of coil 72 leading to circulator pump 40 through conduit 74 thus boosting the temperature of heating water that has been cooled by its flow through the various room hydronic heating units such as baseboard fin tube units or radiators. Similarly, the cold supply water at 7 uses the interleaved flue heat exchanger 70, a single section of flue pipe 2 can be used to recover waste heat year round regardless of whether the burner 6 is being fired to generate heat, hot water, or both. It is highly likely that circulator pump 40 will be running or that domestic hot water demand will occur while burner 6 is active or while flue pipe 2 is still hot from a recent firing. For dual-use installations, this maximizes the flue waste heat recover on a seasonal basis.

Figure 9:
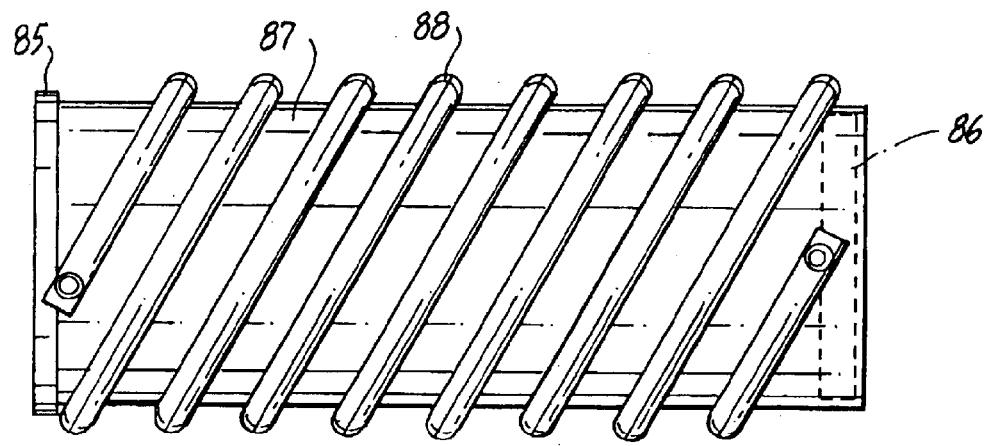
FIG. 9 is a perspective view of another embodiment of a flue heat exchanger.
Figure 9A:
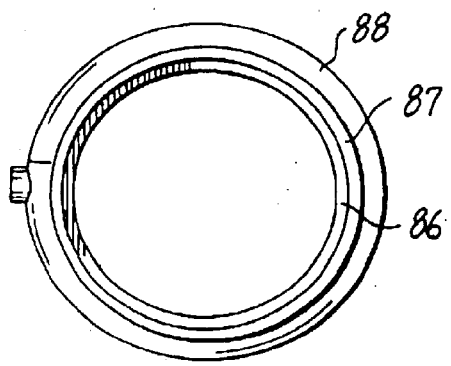
FIGS. 9A and 9B are respective end and cross sectional views of the embodiment shown in FIG. 9.
Figure 9B:
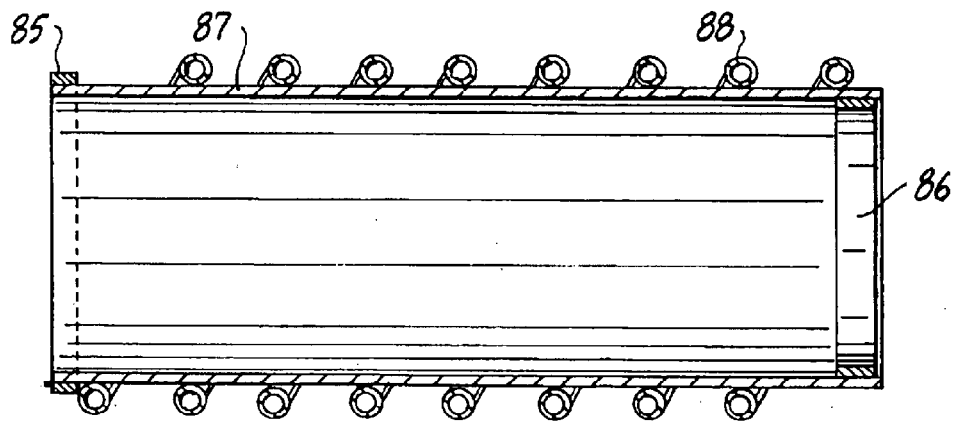

FIGS. 9, 9A and 9B show an alternate embodiment of a flue heat exchanger with particular gaskets 85, 86. This is because when two or more different types of metals contact each other, the metals may sometimes deteriorate, corrode or weaken at the point of contact. Therefore, while it is preferable that a flue heat exchanger may be constructed such that both the metal tubing 88 and the section 87 of flue piping that the metal tubing 88 is wrapped around are made from the same type of metal, preferably copper, modifications must be made if different metals are in contact with each other.

Therefore, FIGS. 9, 9A and 9B show a flue piping section 87 of a flue heat exchanger having metal tubing 88 wrapped around it, with flue piping section 87 having gaskets 85, 86 located at each end of flue piping section 87(preferably copper), such that the gaskets 85, 86 prevent direct contact between this flue pipe section 87 and the permanent flue pipe section which may be made from a different type of metal other than copper, to which flue pipe section 87 is attached.

The split external heat exchanger is yet another embodiment that is especially adapted for the "do-it-yourself" market as exemplified by the large chains of home improvement outlets. This design is simply placed over an existing flue pipe and bolted together. The flue pipe need not be disassembled. It also fits over seams in flue pipes so that the heat exchanger section can be longer than an individual section of flue as long as a total straight section of flue of sufficient length is available.

Figure 10:
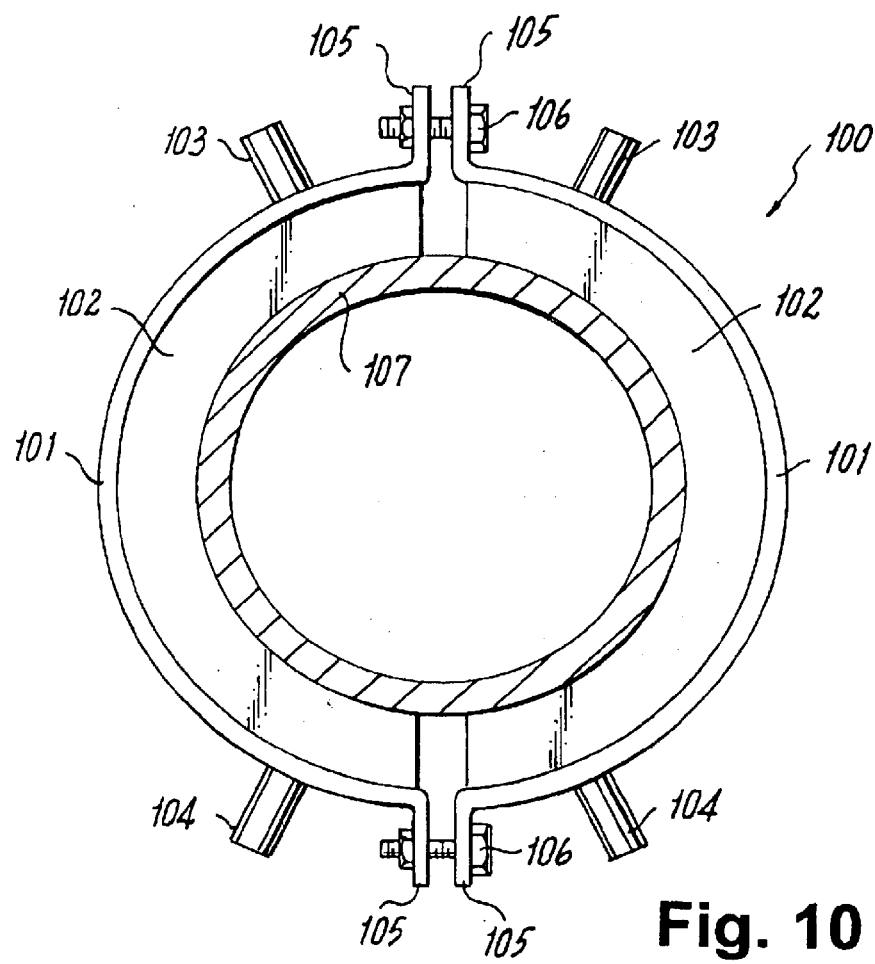
FIG. 10 is a side end view of an alternate embodiment for a split external heat exchanger assembled over a flue pipe.

FIG. 10 shows a split heat exchanger 100 assembled over existing flue pipe 107. It includes two identical halves with heat exchanger element 102 formed within shell 101. Semi-circular end pieces and a layer of thermal insulation between heat exchanger element 102 and shell 101 can be added to reduce heat loss to ambient air, but they are not essential to good operation. Flanges 105 with multiple holes and bolts 106 are used to hold the two halves together tightly around flue 107. Nipples 103 and 104 are inlet and outlet (or reversed) nipples to permit liquid flow through heat exchanger elements 102. Three separate embodiments of heat exchanger elements 102 are described.

Figure 10A:
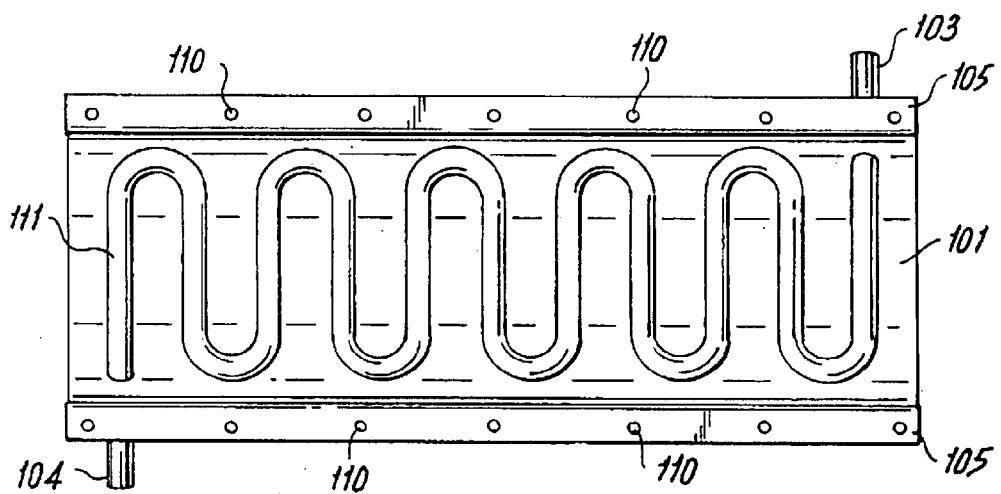
FIG. 10A is a side internal elevation view thereof showing a transverse serpentine heat exchanger element.

FIG. 10A shows element 111 which includes a separate hollow fluid flow chamber, such as a transverse serpentine tubing section conforming to the interior of shell 101 with attachment holes 110 in flanges 105. Heat exchanger element 111 with its many flow reversals creates much flow turbulence which enhances heat transfer efficiency, however each transverse section must be shaped in a circular manner to conform to shell 101.

Figure 10B:
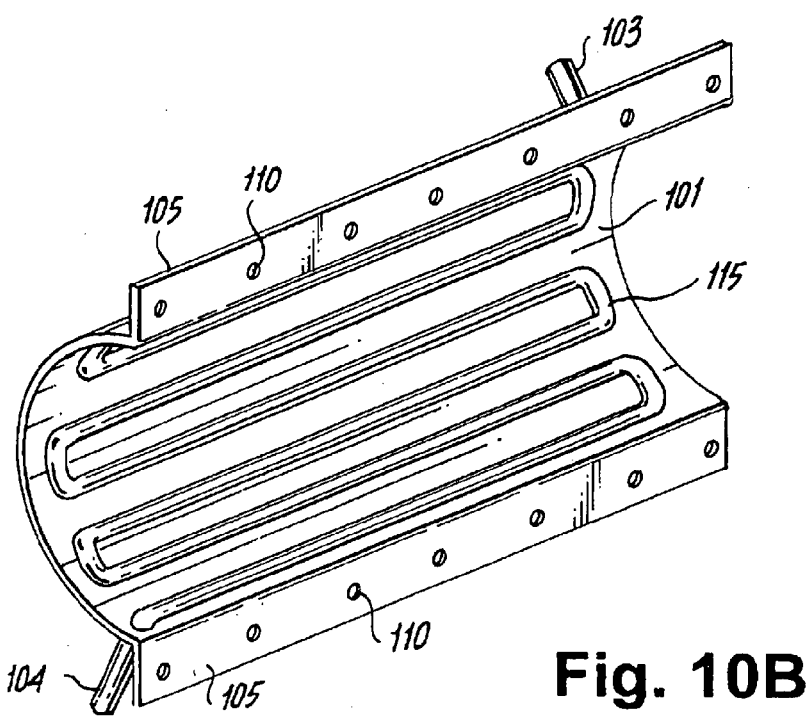
FIG. 10B is a perspective internal view thereof showing a longitudinal serpentine heat exchanger element.

FIG. 10B shows a second type of heat exchanger element 115 wherein the separate hollow fluid flow chamber is a longitudinal serpentine tubing section which is easier to conform to shell 101 since the straight pipe sections do not require forming.

Figure 10C:
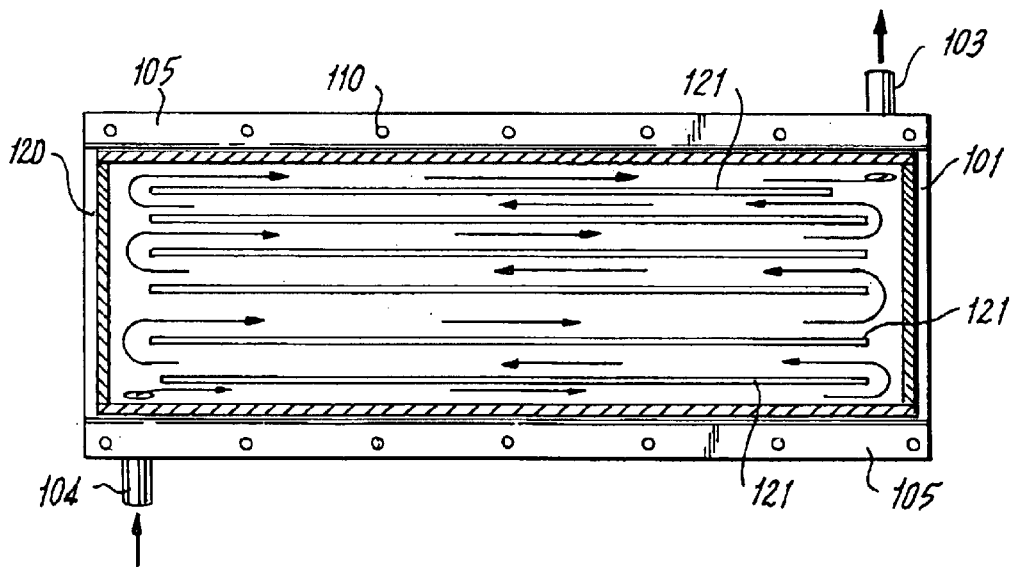
FIG. 10C is a side internal view in cross section showing the fluid path through a formed tank heat exchanger element.

A third heat exchanger element 120 shown in FIG. 10C includes a shallow tank with curved inner and outer surfaces and circular end pieces. The inner surface conforms closely to the outer diameter of a flue pipe enhancing heat transfer while the outer surface conforms to shell 101. Each separate hollow, fluid flow chamber comprises a fluid flow path formed by internal straight baffle plates 121 directing liquid flow in a reversing path, as shown by the arrows to increase turbulence and prevent stagnant regions.

While FIG. 10C shows the hollow fluid flow path to be longitudinally oriented similar to the longitudinal serpentine fluid flow path shown in FIG. 10B, alternatively curved baffle plates (not shown) can be used to simulate a transverse fluid flow path, similar to the transverse fluid flow path of FIG. 10A.

Figure 10D:
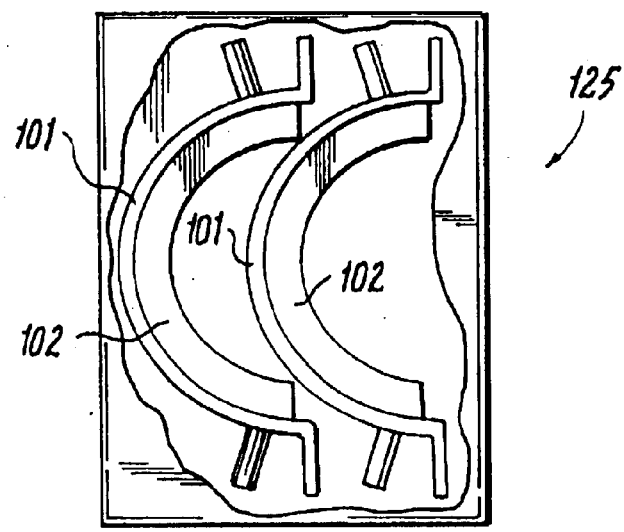
FIG. 10D is an end view in cross section of nested sections of the split heat exchanger in a shipping carton.

Since the intent is to market split heat exchangers 100 through retail home improvement centers, any features that enhance packaging and shipping is an asset. FIG. 10D shows a top view of the two halves of split heat exchanger 100 partially nested in a compact configuration in shipping carton 125.

Figure 10E:
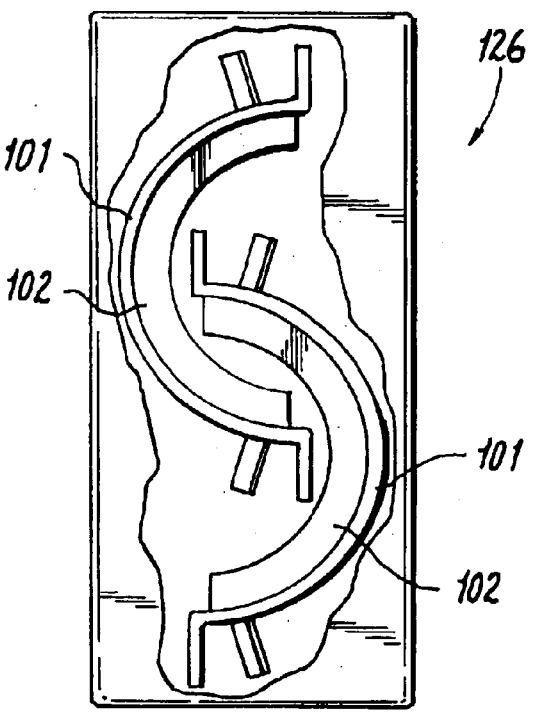
FIG. 10E is an end view in cross section of reversed nested sections of the split heat exchanger in a shipping carton.

An alternate configuration using reverse nesting in shallower box 126 is shown in FIG. 10E.

Because split heat exchanger 100 has two independent heat exchanger elements 102, these can be plumbed in a number of ways to achieve desired results. It can also be appreciated that multiple split heat exchangers 100 can be used on a single long flue and plumbed as a single system or as individual heat exchangers.

Figure 10F:
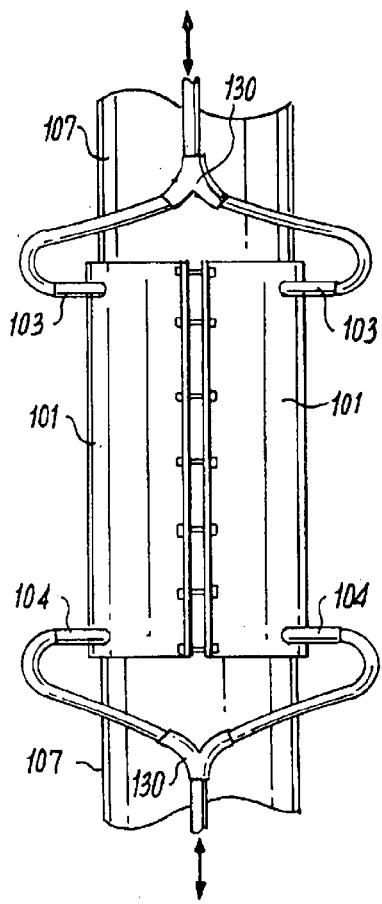
FIG. 10F is a side elevation view of a split heat exchanger thereof installed and plumbed for parallel flow of both sections.

FIG. 10F shows how split heat exchanger 100 can be connected so that each section is in parallel by connecting both nipples 104 to Y-connector 130 and both nipples 103 to a second Y-connector 130.

Figure 10G:
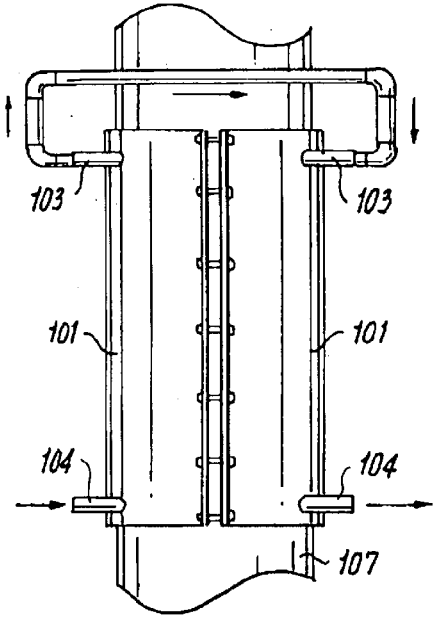
FIG. 10G is a schematic representation of plumbing for a series connection of both sections of the split heat exchanger thereof; and, FIG. 10H is a schematic representation of plumbing for a separate use of each section thereof.

FIG. 10G shows a series connection which would produce a higher output temperature by connecting the input to nipple 104 of the first side and then connecting nipple 103 of the first side to nipple 103 of the second side. Output flow is then from nipple 104 of the second section.

Figure 10H:
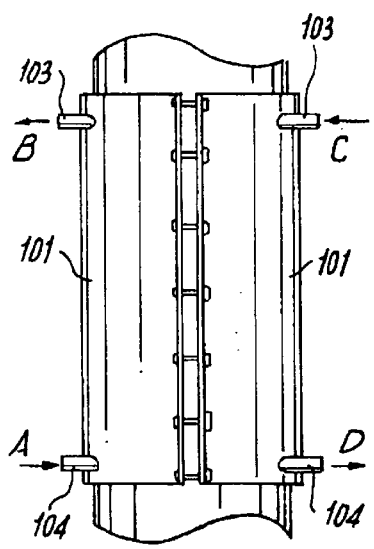

FIG. 10H shows a plumbing configuration where both sections are used independently. In fact, the left section with input A at nipple 104 and output B at nipple 103 can be used for domestic hot water, while the right section with input C at nipple 103 and output D at nipple 104 can be used to boost boiler return water in hydronic heating.

It is further noted that other modifications may be made to the present invention, without departing from the scope of the invention, as noted in the appended claims.

I claim:

1. A heat exchanger for preheating domestic water by transferring heat from a flue containing combustion gases flowing therethrough comprising:

said heat exchanger replacing a portion of said flue and having a single, tube for connecting the replaced portion of said flue to allow flow of combustion gases therethrough;

said single tube being axially oriented with said flue;

said single tube being smooth and unencumbered in an interior portion thereof;

said single tube being enclosed by a cylindrical shell spaced from said single tube with caps at upstream and downstream ends of said shell for fully enclosing a space within said shell surrounding said single tube;

helical tubing being located within said shell, said helical tubing having an inlet adjacent a downstream end of said helical tubing and an outlet adjacent an upstream end of said helical tubing;

said shell having a pair of respective openings accommodating said inlet and said outlet of said helical tubings therethrough;

said helical tubing within said shell coiled around said tube, said helical tubing connecting said inlet and outlet within said shell;

a highly conductive conformable loose aggregate of fibrous material filling spaces within said shell between and around said helical tubing to increase heat transfer from combustion gases within said single tube to said helical tubing;

said shell being made from insulating material and said end caps being heat resistant; and means for circulating water through said helical tubing from said inlet to said outlet of said helical tubing within said shell for heating said water.

2. The heat exchanger as recited in claim 1 in which said shell is removable and has facing edges extending axially along said shell passing through each of said inlet and outlet of said helical tubing with clasps for joining said edges together.

* * * * *